US007101095B2

(12) United States Patent
Kajino et al.

(10) Patent No.: US 7,101,095 B2
(45) Date of Patent: Sep. 5, 2006

(54) ROTATION TYPE CAMERA APPARATUS

(75) Inventors: Tetsurou Kajino, Meguro-ku (JP); Jouji Wada, Yokohama (JP); Yoshihiro Fujiwara, Sagamihara (JP); Gil Palma Guerrero, Jr., Manila (PH)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/085,075

(22) Filed: Mar. 22, 2005

(65) Prior Publication Data

US 2005/0175335 A1 Aug. 11, 2005

Related U.S. Application Data

(62) Division of application No. 10/611,993, filed on Jul. 3, 2003, now Pat. No. 6,890,110.

(30) Foreign Application Priority Data

Jul. 8, 2002 (JP) ............................ 2002-199137

(51) Int. Cl.
*G03B 17/00* (2006.01)
*H04N 7/18* (2006.01)

(52) U.S. Cl. ...................................... 396/427; 348/143

(58) Field of Classification Search ................ 396/427; 348/143, 158; D16/203

See application file for complete search history.

(56) References Cited

U.S. PATENT DOCUMENTS 4,945,367 A 7/1990 Blackshear ................. 396/427
6,234,691 B1 5/2001 Jones et al. ................. 396/427
6,392,704 B1 5/2002 Garcia-Ortiz ............... 348/373
6,705,774 B1 3/2004 Tashiro et al. .............. 396/427
6,890,110 B1 * 5/2005 Kajino et al. ............... 396/427
2002/0085844 A1 7/2002 Tashiro et al. .............. 396/427
2004/0032492 A1 2/2004 Wada et al. ................ 348/143

FOREIGN PATENT DOCUMENTS

JP 2000-155366 6/2000

* cited by examiner

*Primary Examiner*—W. B. Perkey
(74) *Attorney, Agent, or Firm*—Wenderoth, Lind & Ponack, L.L.P.

(57) ABSTRACT

A housing of a rotation type camera apparatus has a standing installation surface for standing installation and a wall-mounting installation surface for wall-mounting installation. The housing is also provided with a dome type cover composing a shooting window facing in a slanting direction with respect to a horizontal direction in a standing-mounting position and in a wall-mounting position. A camera is provided so as to be able to shoot outside from the shooting window. A camera rotation device is accommodated in the dome and has a pan rotation axis based on the horizontal direction. The shooting window faces in an appropriate direction in both the standing-mounting position and the wall-mounting position. Since the pan rotation axis is set based on the horizontal direction, a viewer's eyes do not run up and down so much during the pan rotation.

8 Claims, 13 Drawing Sheets

ROTATION TYPE CAMERA APPARATUS

This is a divisional application of U.S. patent application Ser. No. 10/611,993, filed Jul. 3, 2003 now U.S. Pat. No. 6,890,110.

BACKGROUND OF THE INVENTION

1. Field of the Invention

The present invention relates to a rotation type camera apparatus and, more particularly, to a rotation type camera apparatus suited both to being stood or placed on something like a desk or to being hung on a wall.

2. Description of the Related Art

A dome type monitoring or surveillance camera is previously known as an example of a rotation type camera apparatus. The dome type monitoring or surveillance camera has a cylindrical housing to which a hemispheric transparent dome cover is attached. In the cover, a camera is provided together with a pan/tilt rotation mechanism (a rotation mechanism for a pan direction and a tilt direction).

The dome type surveillance camera is installed facing downwards on a ceiling. The dome type surveillance camera is imbedded on, attached to, or hung from a ceiling. Sometimes a dedicated shelf-like attachment is attached to a wall, and the dome type surveillance camera is attached facing downward to it. This type of installation, using the underside of the shelf as a ceiling, is a kind of ceiling installation.

As mentioned above, the conventional rotation type camera apparatus is commonly a monitoring or surveillance camera, which is installed only on a ceiling and does not have a structure for installation by standing or being placed or put on something like a desk or the like. Indeed, a surveillance camera has been previously and occasionally installed on a wall, but then a dedicated attachment to make a shelf is necessary as mentioned above. Therefore, the conventional rotation type camera apparatus is not suited for installation by standing and installation by hanging on a wall.

SUMMARY OF THE INVENTION

Taking into consideration the above background, it is an object of the present invention to provide a rotation type camera apparatus suited for both standing and wall-mounting.

A rotation type camera apparatus of the present invention comprises a housing, a camera, and a camera rotation device. The housing is provided with a standing structure for standing installation, which includes installation by placing or putting on a desk, a table-top, a floor and so on, and a wall-mounting structure for mounting on a wall, and has a shooting window formed thereon which faces in a slanting direction with respect to a horizontal direction in a standing-mounting position and in a wall-mounting position. The camera is provided so as to be able to shoot outside from the shooting window. The camera rotation device has a pan rotation axis based on the horizontal direction. Since this structure makes the shooting window face in a slanting direction in both the standing-mounting position and the wall-mounting position, it is possible to shoot in the appropriate direction both when standing or wall-mounted. Moreover, according to the above structure which sets the pan rotation axis based on the horizontal direction, it is possible to obtain a natural image with it no longer being necessary for a viewer to run their eyes up and down so much during the pan rotation, as described below.

The reason is this: the conventional camera rotation device sets its pan rotation axis based on a shooting window. Therefore, if the conventional camera rotation device is applied to the rotation type camera apparatus of the present invention, the pan rotation axis will be set based on the shooting window which faces in a slanting direction. In such a case, a viewer's eyes run up and down along an arch line during the pan rotation, as if a viewer is following a path of the sun, a star or the like across the sky. This does not feel particularly natural to a viewer. In comparison with this case, the device of the present invention sets the pan rotation axis based on the horizontal direction in the standing-mounting position, and therefore it is possible to obtain a natural image with a viewer's eyes not having to run up and down so much during the pan rotation.

A wall-mounting position is typically an inverted position of a stand-mounting position, but the present invention is not limited in this respect. The pan rotation axis based on the horizontal direction is typically an axis perpendicular to the horizontal direction, but the present invention is not limited to this. Providing that the obtained image remains natural, the pan rotation axis does not need to be perpendicular to the horizontal direction and may be inclined with respect to the horizontal direction.

In the rotation type camera apparatus of the present invention, the housing may have at the shooting window a dome type cover facing in the slanting direction, and at least one portion of the camera and the camera rotation device may be accommodated in the dome type cover. By accommodating the camera and the camera rotation device in the dome type cover, the rotation type camera apparatus can be made more compact.

For example, with a hemispheric dome type cover arranged at an angle, the apparatus can shoot in both a vertical and a horizontal direction in both the standing-mounting position and the wall-mounting position. Therefore, it is possible to shoot a sufficiently wide area in both the standing-mounting position and the wall-mounting position.

In the rotation type camera apparatus of the present invention, the standing structure may be composed of a standing installation surface provided on the housing. According to this structure, standing installation of the rotation type camera apparatus is made possible just by placing the apparatus on a desk, a floor or the like. Therefore, the rotation type camera apparatus can be easily installed by placing without using a tripod or the like.

In the rotation type camera apparatus of the present invention, the wall-mounting structure may comprise a wall-mounting installation surface provided on the housing and a wall hanger provided on the wall-mounting installation surface. With this structure, the rotation type camera apparatus can be easily hung on a wall. The wall hanger has, for example, a structure like a hole in the bottom of a telephone set for hanging the set on a wall.

In the rotation type camera apparatus of the present invention, the wall-mounting structure may comprise a wall hanger for hanging the housing on a wall in such a position that the shooting window faces downwards in a slanting direction, and a wall hanger for hanging the housing on a wall in such a position that the shooting window faces upwards in a slanting direction. This structure allows wall-mounting installation in two positions upside down to each other, and increases flexibility in camera installation styles.

In the rotation type camera apparatus of the present invention, the housing may have a triangular prism portion which is composed of a standing installation surface, a wall-mounting installation surface, and an incline (inclined surface) provided with the shooting window. This structure offers a rotation type camera apparatus which can be easily stood and hung on a wall with a compact shape of a triangular prism.

Another aspect of the present invention is a rotation type camera apparatus comprising: a standing structure for standing installation; a wall-mounting structure for wall-mounting installation; a dome section provided so as to face in a slanting direction with respect to a horizontal direction of a standing-mounting position and a wall-mounting position; a camera provided so as to be able to shoot outside from the dome section; and a camera rotation device having a pan rotation axis based on the horizontal direction. This structure also has the above advantages of the present invention. The dome section may or may not have a transparent cover.

From another point of view, it can be said that the present invention makes it possible to obtain a more natural image with an arrangement of an inclined shooting window. From this viewpoint, the rotation type camera apparatus of the present invention comprises: a housing provided with a shooting window which faces in a slanting direction with respect to a horizontal direction of installation; a camera provided so as to be able to shoot outside from the shooting window; and a camera rotation device having a pan rotation axis based on the horizontal direction. Since this structure sets the pan rotation axis not based on the shooting direction but based on the horizontal direction in the position of installation, it is possible to obtain a natural image with a viewer's eyes not having to running up and down so much during the pan rotation. From this point of view, the installation position of the rotation type camera apparatus is not restricted. For example, the apparatus may be used only in either the standing-mounting position or the wall-mounting position.

Another aspect of the present invention is a rotation type camera apparatus comprising: a housing provided with a first mount structure for a first mount position and with a second mounting structure for a second mount position, and having a shooting window formed thereon facing in a slanting direction with respect to a horizontal direction in the first mount position and in the second mounting position; a camera provided so as to be able to shoot outside from the shooting window; and a camera rotation device having a pan rotation axis based on the horizontal direction. The first mount structure and the second mount structure may be the standing structure and the wall-mounting structure described above.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE PREFERRED EMBODIMENT

The preferred embodiment of the present invention will now be described with reference to drawings.

Figure 1B:
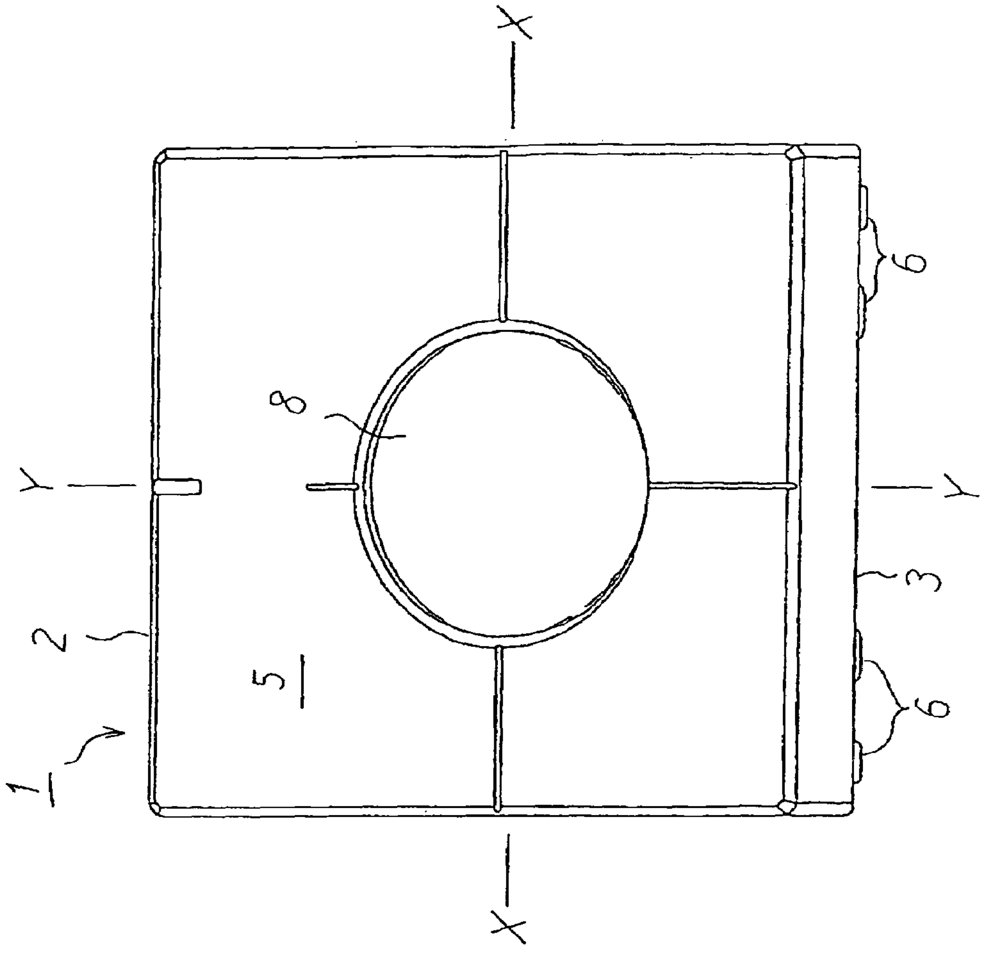
FIGS. 1A and 1B are external views showing a rotation type camera apparatus of the preferred embodiment according to the present invention in the standing-mounting position.
Figure 1A:
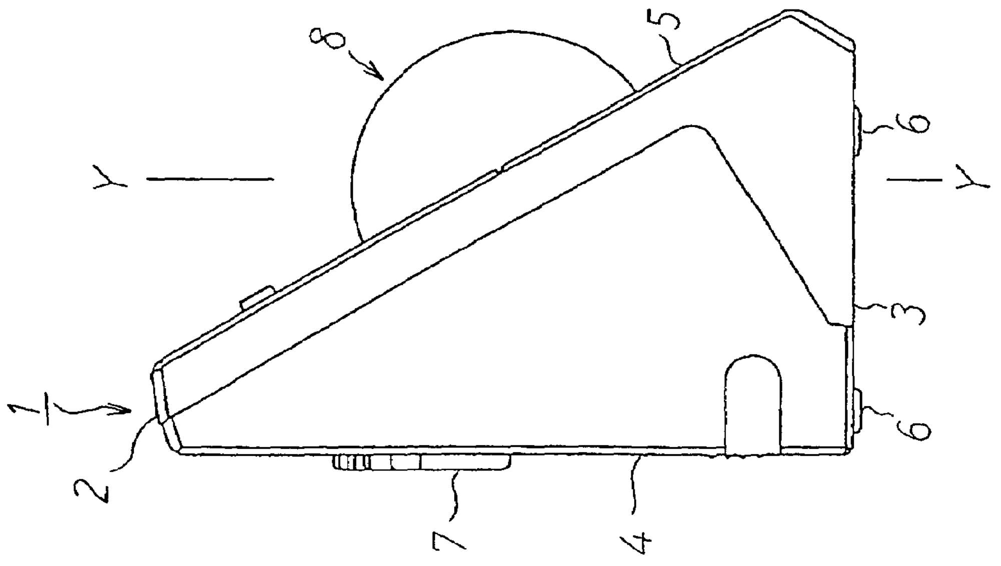
Figure 2B:
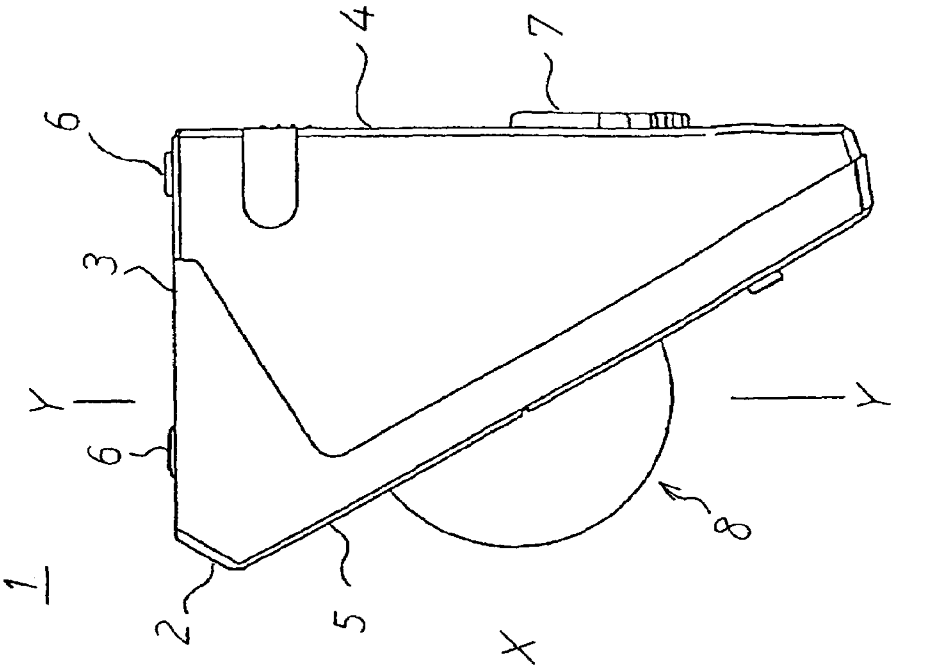
FIGS. 2A and 2B are external views showing the rotation type camera apparatus of the preferred embodiment according to the present invention in the wall-mounting position.
Figure 2A:
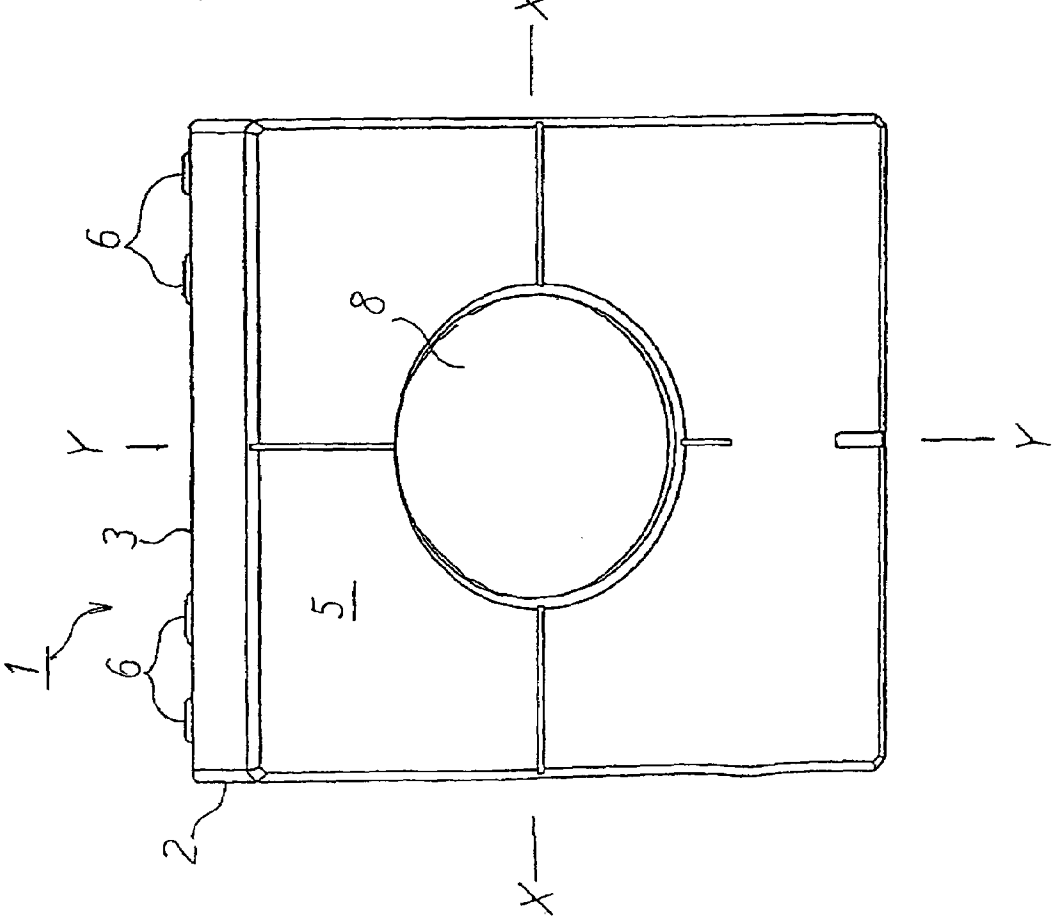

FIGS. 1A and 1B are external views of a rotation type camera apparatus 1 in a standing-mounting position of the preferred embodiment. FIGS. 2A and 2B are external views of the rotation type camera apparatus 1 in a wall-mounting position. Furthermore, FIG. 3 is a perspective view of a camera rotation device 10 built into the rotation type camera apparatus 1 shown in FIGS. 1A and 1B and FIGS. 2A and 2B.

First, the camera rotation device 10 shown in FIG. 3 will be described. Then, going back to FIGS. 1A and 2B and FIGS. 2A and 2B, the rotation type camera apparatus 1 of the preferred embodiment will be described.

Camera Rotation Device

Figure 3:
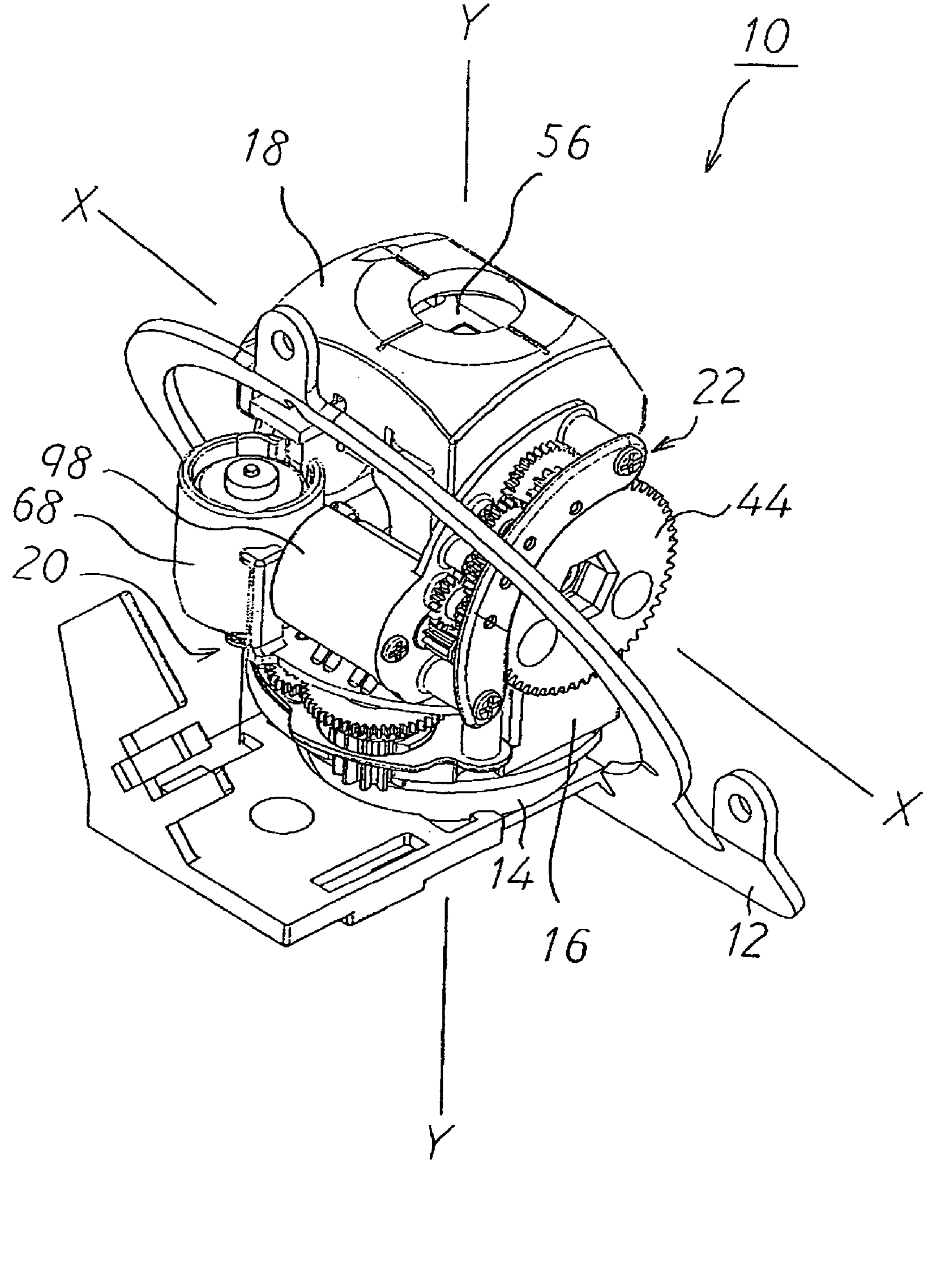
FIG. 3 is a perspective view showing a camera rotation device of the preferred embodiment according to the present invention.
Figure 4:
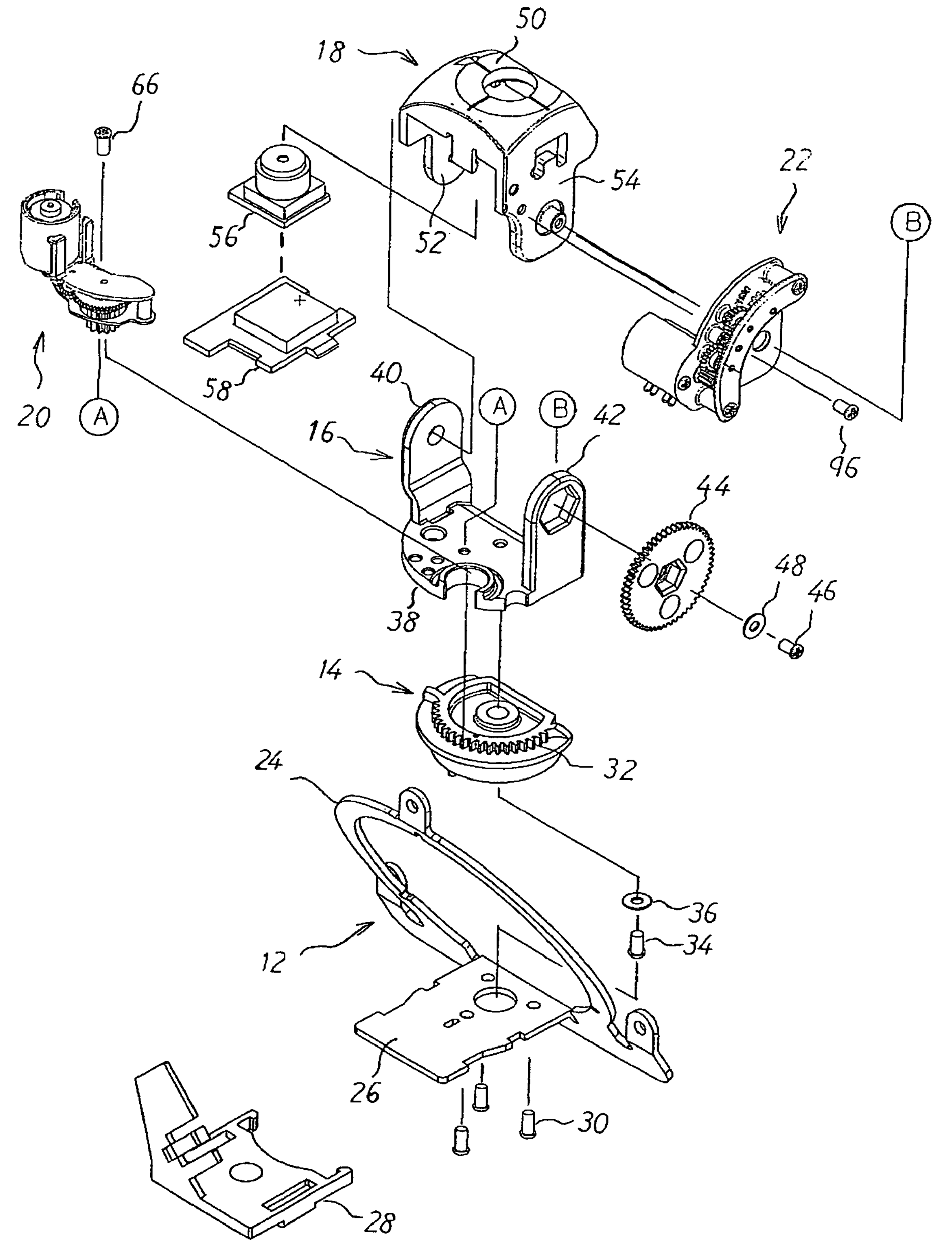
FIG. 4 is an exploded view of the camera rotation device shown in FIG. 3.

FIG. 3 shows a camera rotation device 10 of the preferred embodiment (with a camera mounted thereon), and FIG. 4 is an exploded view of the camera rotation device 10.

The camera rotation device 10 is applied, for example, to a monitoring or surveillance camera. The camera rotation device 10 can also be used in a computer system. By using a small camera equipped with the camera rotation device 10 as a network camera, an image of the camera can be provided via networks such as LAN or the Internet. The camera rotation device 10 can also be applied to cameras for any other purposes.

The camera rotation device 10 can rotate upon a pan axis Y in a pan direction and upon a tilt axis X in a tilt direction. In the following description, an arrangement of FIG. 3 will be regarded as a standard and a direction along the pan axis Y is referred to as an up/down direction and a direction along the tilt axis X is referred to as a right/left direction. Also, a direction perpendicular to the tilt axis X in the horizontal plain is referred to as a front/back direction or a forward/backward direction.

Of course, these directions do not need to correspond with the directions during the camera's usage. For example, in the case of applying the camera rotation device 10 to a surveillance camera and if the camera is used inverted, the directions will be upside down.

As shown in FIGS. 3 and 4, the camera rotation device 10 has, from bottom to top, a mounting frame 12 and a main base 14 constituting a base section, a pan base 16 constituting a pan section, and a lens frame 18 constituting a tilt section. Furthermore, the camera rotation device 10 has a pan rotation unit 20 and a tilt rotation unit 22 shown in both sides of FIG. 4.

The mounting frame 12 is a pressed and bent iron member and has a ring portion 24 and a main base attaching portion 26 which is bent from the ring portion 24. The ring portion 24 has three flange portions which will be used to attach the ring portion 24 to a housing not shown in the drawings. Also, the main base attaching portion 26 is attached with a code holder 28 which holds codes of a camera and motors.

The main base 14 is fixed on the main base attaching portion 26 using three screws 30. The main base 14 is made of resin and is approximately disc-shaped as shown in the drawing. A pan end gear 32 centered on the pan axis Y is provided in one piece with the main base 14. The pan end gear 32 is a spur gear and corresponds to a rotating side stationary gear in a pan rotation mechanism.

In this preferred embodiment, a rotating side (swiveling side) means a side to rotate (swivel) other members, and a rotated side (swiveled side) means a side to be rotated (swiveled) by other members.

As shown in the drawing, the pan end gear 32 does not need to be provided all around the main base 14. The pan end gear 32 just needs to cover a necessary area of the pan rotation. In this preferred embodiment, the pan rotation angle (horizontal rotation angle) is 140 degrees, so the pan end gear 32 just needs to be provided for the 140-degree-area or more.

The pan base 16 is attached on the main base 14 using a screw 34 and a flat washer 36 so as to be rotatable around the pan axis Y. The pan base 16 is made of resin and has a flat disc-shaped pan base body 38, and a left wall portion 40 and a right wall portion 42 which extend upwards from both sides of the pan base body 38 respectively. These portions of the pan base 16 are formed in one piece.

The pan rotation unit 20 is fixed on the pan base body 38 using a screw 66. As described later, a gear which is a component of the pan rotation unit 20 comes through a round opening of the pan base body 38 and is in meshing engagement with the pan end gear 32 of the main base 14.

Also, a resin-made tilt end gear 44 is non-rotatably fixed to outside of the right wall portion 42 of the pan base 16, centered on the tilt axis X. Here, a hexagonal projection of the tilt end gear 44 which is not shown in the drawing fits into a hexagonal opening of the right wall portion 42 and therefore prevents the rotation of the tilt end gear 44. The tilt end gear 44 is a spur gear and corresponds to a rotating side stationary gear in a tilt rotation mechanism.

A resin-made lens frame 18 is attached between the left wall portion 40 and the right wall portion 42 of the pan base 16 so as to be rotatable around the tilt axis X. The lens frame 18 has a frame body 50, and a left hung wall portion 52 and a right hung wall portion 54 which extend downwards from both sides of the frame body 50. These portions of the lens frame 18 are formed in one piece. The left hung wall portion 52 and the right hung wall portion 54 are respectively attached to the left wall portion 40 and the right wall portion 42 of the pan base 16 so as to be rotatable around the tilt axis X. A boss on the tilt axis X protruding outward from the right hung wall portion 54 comes through a hole of the tilt rotation unit 22; and the boss is rotatably supported by a center hole of the tilt end gear 44 fixed on the right wall portion 42 of the pan base 16 using a screw 46 and a flat washer 48.

As shown in the drawing, a camera 56 and a camera retainer 58 are attached to the lens frame 18 in this order using a snap fit. This assembly of the lens frame 18 is attached to the pan base 16.

The camera 56 is a small camera which comprises CMOS, CCD or the like. It is also preferable to use a small camera made for a cellular phone. The camera 56 shoots through a round opening provided for shooting in the middle of the frame body 50 of the lens frame 18. The camera retainer 58 has a protective cushion between itself and the camera 56.

On the outside of the right hung wall portion 54 of the lens frame 18, the tilt rotation unit 22 is fixed by a screw 96. And, as described later, a gear which is a component of the tilt rotation unit 22 is in meshing engagement with the tilt end gear 44 which is fixed on the pan base 16.

Figure 5:
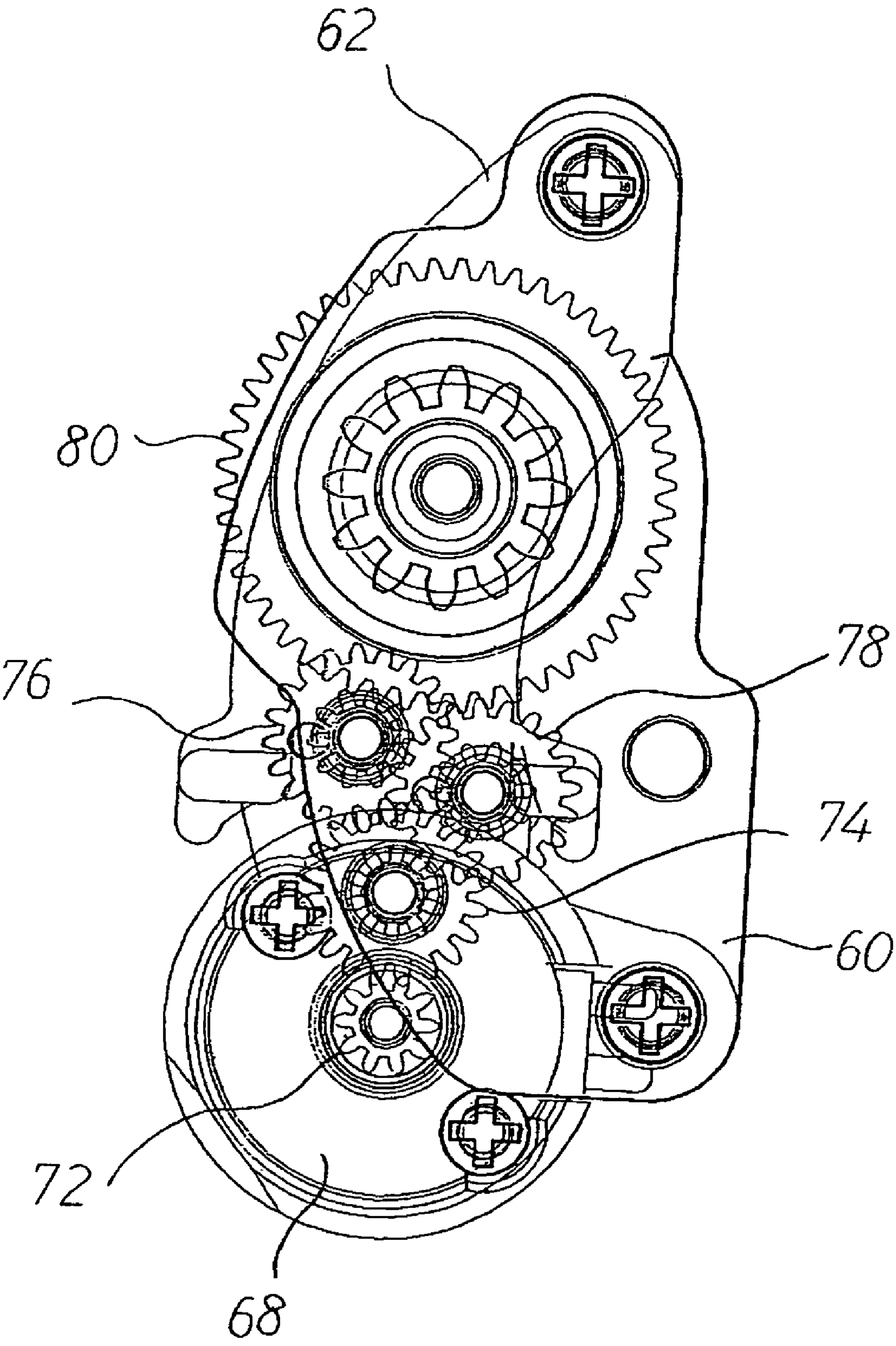
FIG. 5 is a top view of a pan rotation unit provided on the camera rotation device shown in FIG. 3.
Figure 6:
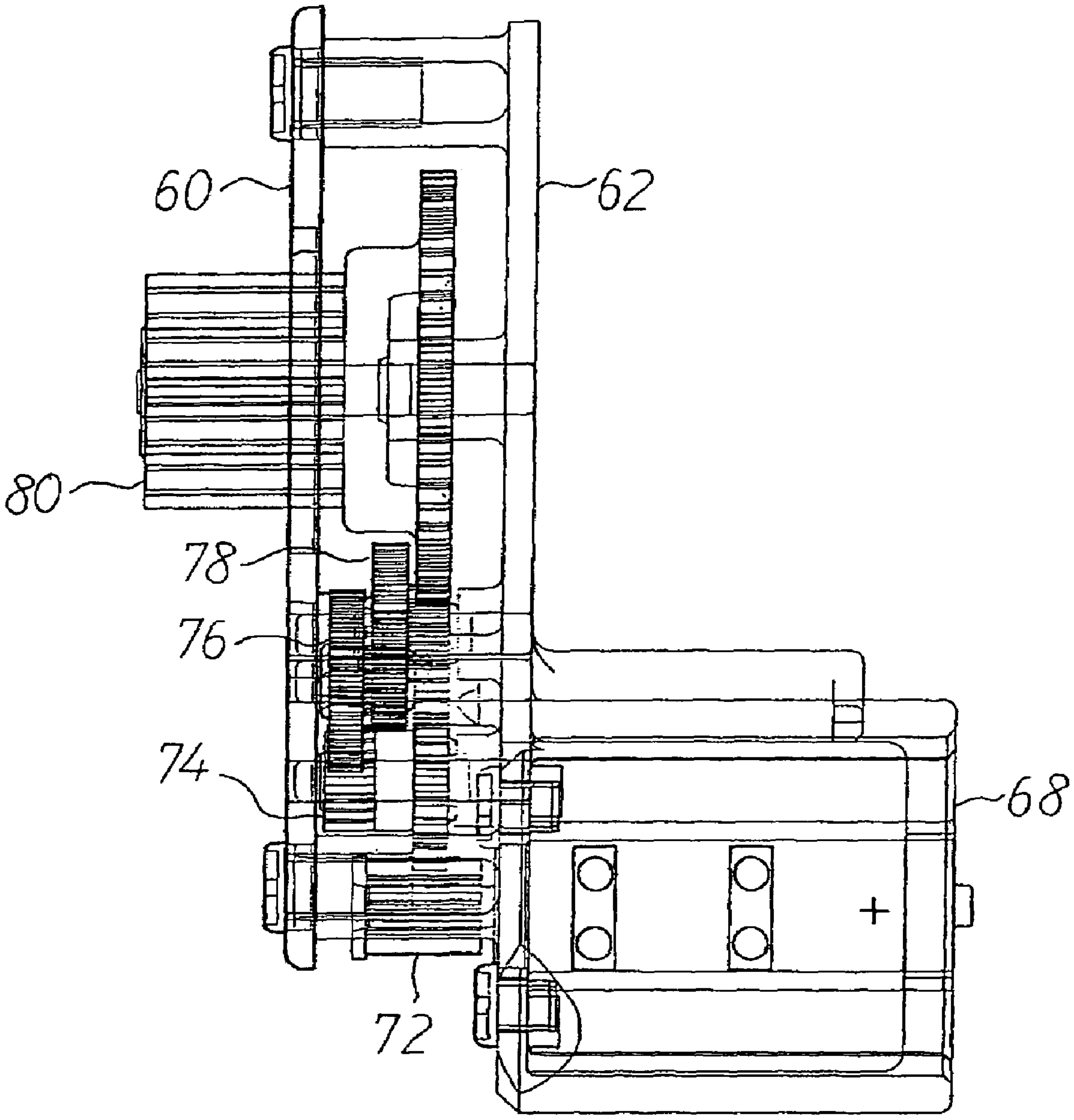
FIG. 6 is a side view of the pan rotation unit provided on the camera rotation device shown in FIG. 3.
Figure 7:
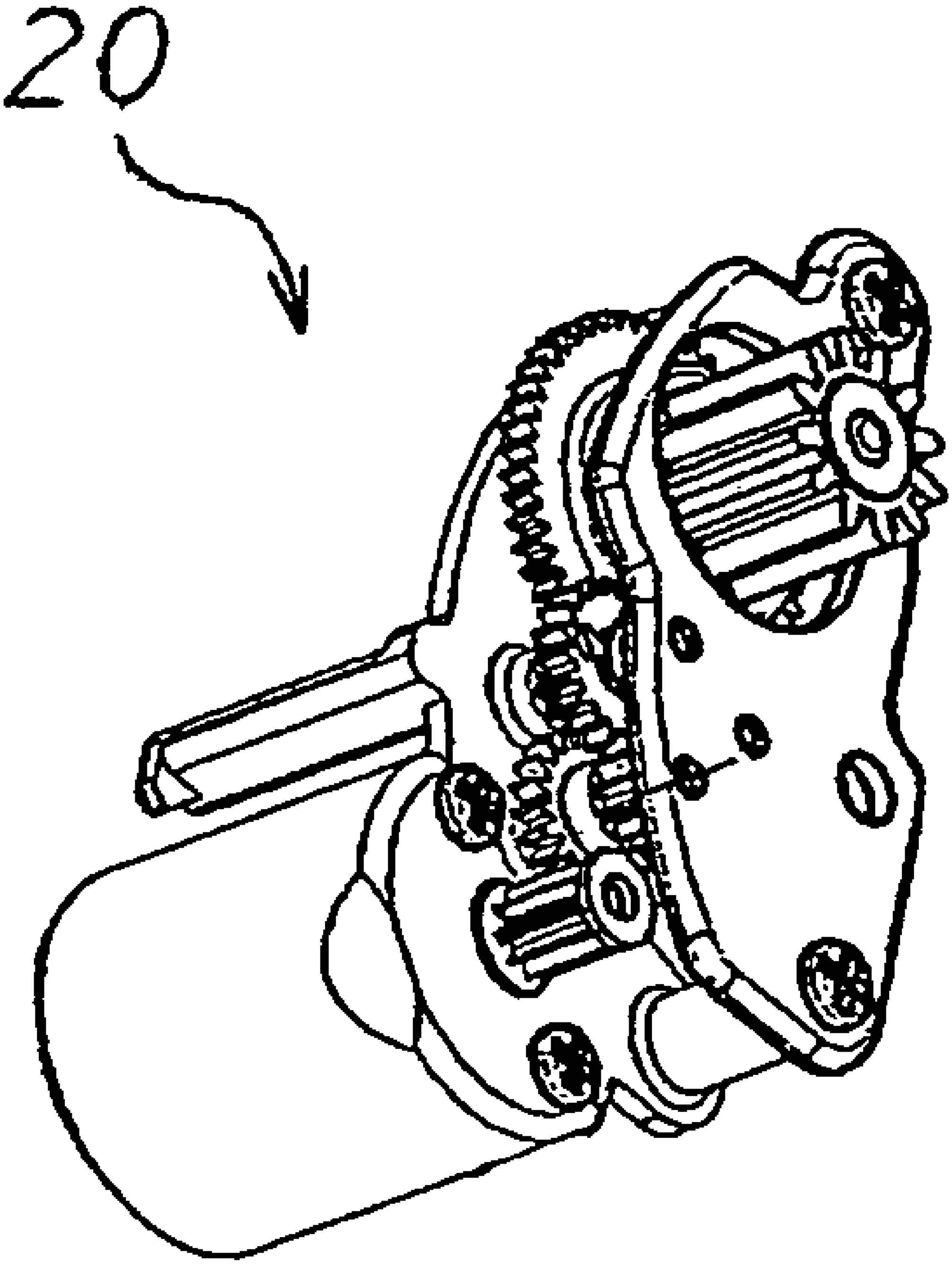
FIG. 7 is a perspective view of the pan rotation unit provided on the camera rotation device shown in FIG. 3.
Figure 8:
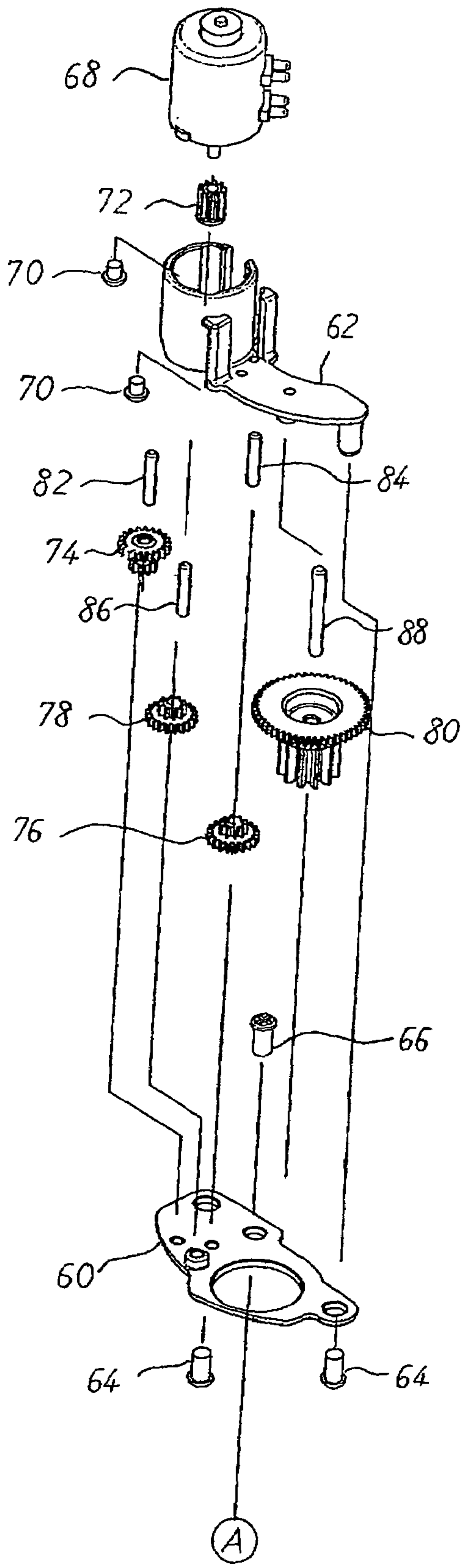
FIG. 8 is an exploded view of the pan rotation unit provided on the camera rotation device shown in FIG. 3.

Next, the structure of the pan rotation unit 20 will be described. FIG. 5 and FIG. 6 are a top view and a side view, respectively, of the pan rotation unit 20. FIG. 7 is a perspective view of the pan rotation unit 20. FIG. 8 is an exploded view of the pan rotation unit 20.

The pan rotation unit 20 has a lower plate 60 and an upper plate 62 which are made of resin. A set of bosses protrudes downward from the upper plate 62.

For each boss, a screw 64 is tightened from the downside through the lower plate 60, thus providing the lower plate 60 and the upper plate 62 at a distance equivalent to the boss's height. The lower plate 60 is fixed on a top face of the pan base body 38 of the pan base 16 by the screw 66.

On the top face of the upper plate 62, a pan motor 68 is fixed by two screws 70. As shown in the drawing, a cylindrical wall portion (cylindrical wall) which is formed in one piece with the upper plate 62 extends upward to cover the pan motor 68. The cylindrical wall portion makes the pan motor 68 less visible from the outside. For example, if an exterior surface of the pan motor 68 is silver or the like, a black resin cylinder can hide the motor.

The pan motor 68 is a stepping motor. A resin-made pan drive gear 72 is fixed to a rotary shaft of the pan motor 68. The pan drive gear 72 is a spur gear which comes through a round opening of the upper plate 62 and protrudes between the upper plate 62 and the lower plate 60.

Furthermore, between the upper plate 62 and the lower plate 60, a first pan reduction gear 74, a second pan reduction gear 76, a third pan reduction gear 78, and a fourth pan reduction gear 80 are rotatably supported by gear shafts 82, 84, 86, and 88 respectively. Each of the four pan reduction gears 74 through 80 is made of resin and has a large diameter gear and a small diameter gear. All of these gears are spur gears. The second pan reduction gear 76 and the third pan reduction gear 78 are the same part. The gear shafts 82 and 86 are the same part.

The pan drive gear 72 of the pan motor 68 is in meshing engagement with the large diameter gear of the first pan reduction gear 74, and the small diameter gear of the first pan reduction gear 74 is in meshing engagement with the large diameter gear of the second pan reduction gear 76. Likewise, the small diameter gear of the second pan reduction gear 76 is in meshing engagement with the large diameter gear of the third pan reduction gear 78, and the small diameter gear of the third pan reduction gear 78 is in meshing engagement with the large diameter gear of the fourth pan reduction gear 80.

The small diameter gear of the fourth pan reduction gear 80 comes through a round opening of the lower plate 60 and protrudes downwards. When the pan rotation unit 20 is fixed to the pan base 16, the small diameter gear of the fourth pan reduction gear 80 comes through a round opening of the pan base body 38 of the pan base 16 and meshes with the pan end gear 32 of the main base 14.

In this way, the pan drive gear 72, the four pan reduction gears 74 to 80, and the pan end gear 32 compose a gear reduction mechanism. The pan drive gear 72 has 10 teeth. Each of the first through third pan reduction gears 74, 76, and 78 has 20 teeth on the large diameter gear and 10 teeth on the small diameter gear; and the fourth pan reduction gear 80 has 50 teeth on the large diameter gear and has 12 teeth on the small diameter gear. Therefore, a reduction ratio of the gear reduction mechanism is $$(2/4)\times(2/4)\times(2/4)\times(2/10)\times(4.8/17.2)=1/143.33.$$

Figure 9:
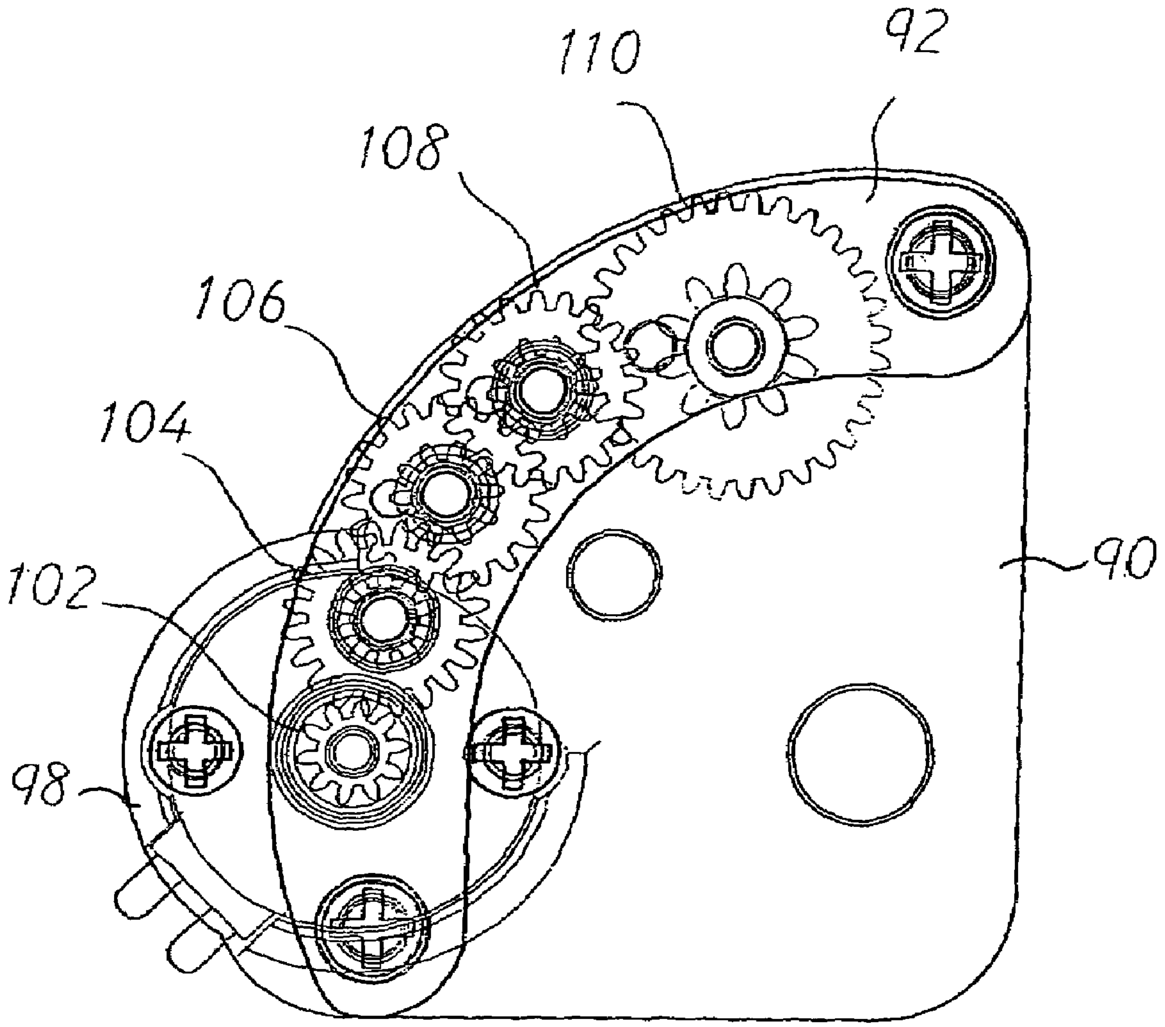
FIG. 9 is a top view of a tilt rotation unit provided on the camera rotation device shown in FIG. 3.
Figure 10:
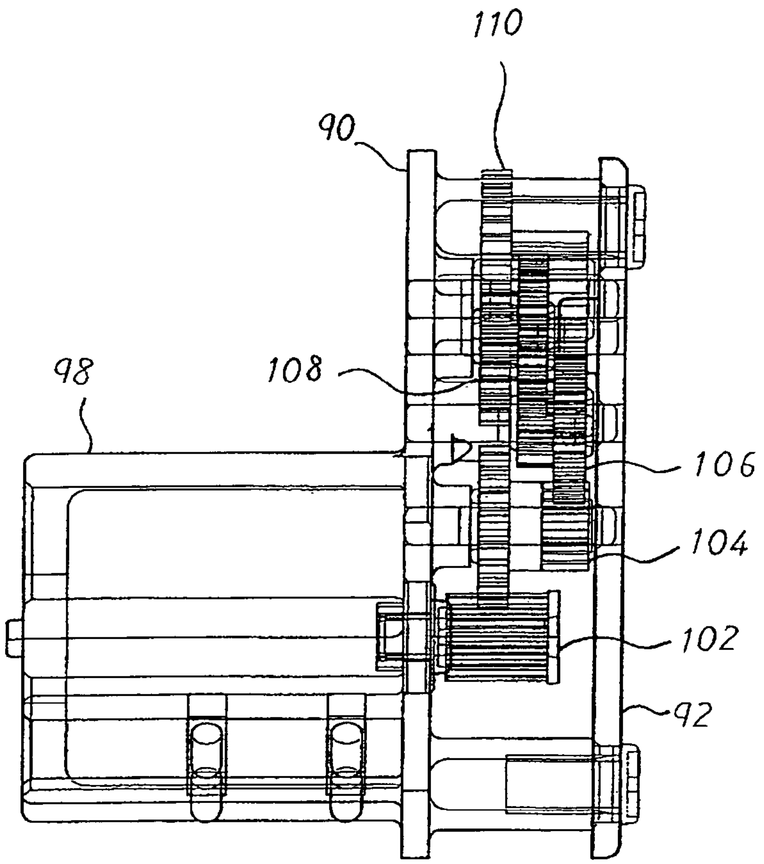
FIG. 10 is a side view of the tilt rotation unit provided on the camera rotation device shown in FIG. 3.
Figure 11:
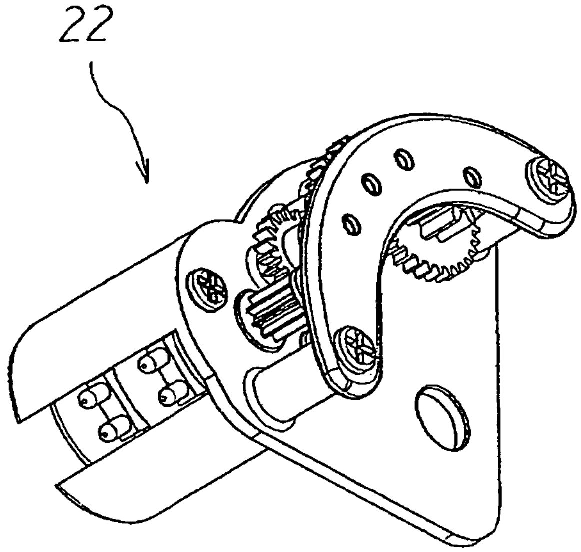
FIG. 11 is a perspective view of the tilt rotation unit provided on the camera rotation device shown in FIG. 3.
Figure 12:
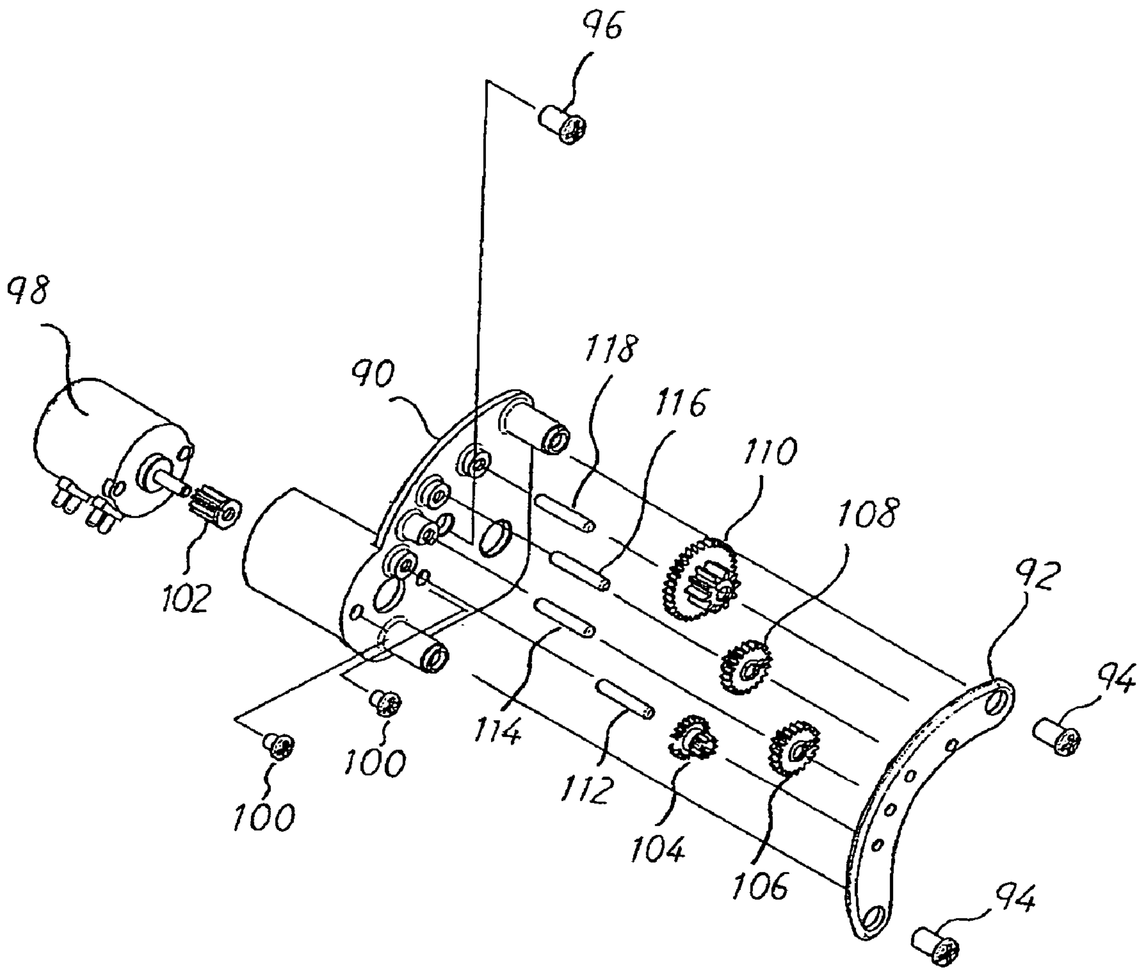
FIG. 12 is an exploded view of the tilt rotation unit provided on the camera rotation device shown in FIG. 3.

Next, the structure of the tilt rotation unit 22 will be described. FIG. 9 and FIG. 10 are a top view and a side view of the tilt rotation unit 22 respectively. FIG. 11 is a perspective view of the tilt rotation unit 22. FIG. 12 is an exploded view of the tilt rotation unit 22.

The tilt rotation unit 22 is the same in principle as the pan rotation unit 20. However, as compared to the pan rotation unit 20 which is fixed to the pan base 16 and rotates the pan base 16 (rotated side) with respect to the main base 14 (rotating side), the tilt rotation unit 22 is fixed to the lens frame 18 and rotates the lens frame 18 (rotated side) with respect to the pan base 16 (rotating side).

The tilt rotation unit 22 has an inside plate 90 and an outside plate 92 which are made of resin. A set of bosses protrudes from the inside plate 90 toward the outside plate 92. For each boss, a screw 94 is tightened through the outside plate 92, thus providing the inside plate 90 and the outside plate 92 at a distance equivalent to the boss's height. The inside plate 90 is fixed outside of the left hung wall portion 54 of the lens frame 18 by a screw 96.

On the pan axis Y side of the inside plate 90, a tilt motor 98 is fixed by two screws 100. As shown in the drawing, a cylindrical wall portion (cylindrical wall) which is formed in one piece with the inside plate 90 extends away from the outside plate 92 to cover the outer circumference of the tilt motor 98. The cylindrical wall portion makes the tilt motor 98 less visible from the outside. For example, if an exterior surface of the tilt motor 98 is a silver color or the like, a black resin cylinder can hide the motor.

The tilt motor 98 is a stepping motor. A resin-made tilt drive gear 102 is fixed to a rotary shaft of the tilt motor 98. The tilt drive gear 102 is a spur gear which comes through a round opening of the inside plate 90 and protrudes between the inside plate 90 and the outside plate 92.

Furthermore, between the inside plate 90 and the outside plate 92, a first tilt reduction gear 104, a second tilt reduction gear 106, a third tilt reduction gear 108, and a fourth tilt reduction gear 110 are rotatably supported by gear shafts 112, 114, 116, and 118 respectively. Each of the four tilt reduction gears 104 through 110 is made of resin and has a large diameter gear and a small diameter gear. All of these gears are spur gears. The second tilt reduction gear 106 and the third tilt reduction gear 108 are the same parts. Also, the gear shafts 112, 116, and 118 are the same parts.

The tilt drive gear 102 of the tilt motor 98 is in meshing engagement with the large diameter gear of the first tilt reduction gear 104, and the small diameter gear of the first tilt reduction gear 104 is in meshing engagement with the large diameter gear of the second tilt reduction gear 106. Likewise, the small diameter gear of the second tilt reduction gear 106 is in meshing engagement with the large diameter gear of the third tilt reduction gear 108, and the small diameter gear of the third tilt reduction gear 108 is in meshing engagement with the large diameter gear of the fourth tilt reduction gear 110.

The small diameter gear of the fourth tilt reduction gear 110 is in meshing engagement with the tilt end gear 44 as follows: When the tilt rotation unit 22 is fixed to the lens frame 18 in such a way that the inside plate 90 abuts on the outside of the right hung wall portion 54, the tilt end gear 44 fixed to the right wall portion 42 of the pan base 16 comes between the inside plate 90 and the outside plate 92. This tilt end gear 44 engages with the small diameter gear of the fourth tilt reduction gear 110.

In this way, the tilt drive gear 102, the four tilt reduction gears 104 to 110, and the tilt end gear 44 compose a gear reduction mechanism. The tilt drive gear 102 has 10 teeth. Each of the first through third tilt reduction gears 104, 106, and 108 has 20 teeth on the large diameter gear and 10 teeth on the small diameter gear; and the fourth tilt reduction gear 110 has 32 teeth on the large diameter gear and has 10 teeth on the small diameter gear. Therefore, a reduction ratio of the gear reduction mechanism is $$(2/4)\times(2/4)\times(2/4)\times(2/6.4)\times(3/15.9)=1/135.68.$$

The above is a description of the tilt rotation unit 22 structure. The tilt motor 98 of the tilt rotation unit 22 and the pan motor 68 of the pan rotation unit 20 are the same part. Likewise, the tilt drive gear 102 and the pan drive gear 72 are the same part; and the first tilt reduction gear 104 and the first pan reduction gear 74 are the same part. Furthermore, the second and the third reduction gears 106 and 108 and the second and third pan reduction gears 76 and 78 are the same part; the gear shafts 112, 116, and 118 and the gear shafts 82 and 86 are the same part; and the gear shaft 114 and the gear shaft 84 are the same part.

Next, an example of assembly steps for the camera rotation device 10 of this preferred embodiment will now be described. First, the camera 56 and the camera retainer 58 are attached to the lens frame 18. The pan rotation unit 20 and the tilt rotation unit 22 are assembled according to the aforementioned exploded view. Then, the tilt rotation unit 22 is attached to the right hung wall portion 54 of the lens frame 18.

On the mounting frame 12, the main base 14, the pan base 16, and the pan rotation unit 20 are attached in order. The pan rotation unit 20 is fixed to the pan base 16 in such a manner that the fourth pan reduction gear 80 meshes with the pan end gear 32 of the main base 14.

Furthermore, while the lens frame 18 is attached to the pan base 16, the tilt end gear 44 is fixed to the pan base 16. At this time, the inside plate 90 of the tilt rotation unit 22 which is attached to the lens frame 18 fits between the right hung wall portion 54 of the lens frame 18 and the right wall portion 42 of the pan base 16. The tilt end gear 44 fits between the inside plate 90 and the outside plate 92 of the tilt rotation unit 22, and is meshed with the fourth tilt reduction gear 110 of the tilt rotation unit 22.

Next, the movement of the camera rotation device 10 of this preferred embodiment will now be described.

When the camera 56 is rotated in the pan direction, the pan motor 68 of the pan rotation unit 20 is spun by the passage of electric current. Of course, the spinning direction is switched according to which way to rotate the camera 56.

In the pan rotation mechanism, the pan motor 68 and the four pan reduction gears 74 through 80 of the pan rotation unit 20 are mounted on the pan base 16 (rotated side, swiveled side); and the pan end gear 32 is fixed to the main base 14 (rotating side, swiveling side).

Therefore, the four pan reduction gears 74 through 80 reduce the speed and transfer torque (rotating force) of the pan motor 68 to the pan end gear 32 (rotating side, swiveling side). Since the pan end gear 32 is fixed, reaction force of the pan end gear 32 rotates the pan motor 68 itself and the pan rotation unit 20 which includes the motor, and thus rotates the pan base 16 accordingly. Then, the camera 56 which is attached to the lens frame 18 on the pan base 16 also rotates upon the pan axis Y.

When the camera 56 is rotated in the tilt direction, the tilt motor 98 of the tilt rotation unit 22 is spun by the passage of electric current. Of course, the spinning direction is switched according to which way the camera 56 is to be rotated.

In the tilt rotation mechanism, the tilt motor 98 and the four tilt reduction gears 104 through 110 of the tilt rotation unit 22 are mounted on the lens frame 18 (rotated side, swiveled side); and the tilt end gear 44 is fixed to the pan base 16 (rotating side, swiveling side).

The four tilt reduction gears 104 through 110 reduce the speed and transfer torque (rotating force) of the tilt motor 98 to the tilt end gear 44 (rotating side, swiveling side). Since the tilt end gear 44 is fixed, reaction force of the tilt end gear 44 rotates the tilt motor 98 itself and the tilt rotation unit 22 which includes the motor, and thus rotates the lens frame 18 accordingly. The camera 56 on the lens frame 18 also then rotates upon the tilt axis X.

As described above, the camera rotation device 10 of the preferred embodiment comprises a motor provided on a rotated side which rotates with a camera with respect to a rotating side which rotates the camera; and a torque transfer means which transfers torque of the motor to the rotating side and therefore rotates the motor as well as the camera on the rotated side by reaction force of the rotating side.

That is to say, in the pan rotation mechanism, the pan motor 68 is provided on the pan base (which composes the pan section) on the rotated side. Torque of the pan motor 68 goes through a reduction gear mechanism which corresponds to a pan torque transfer means, and is transferred to the main base 14 (which composes the base section) of the rotating side. Then, by reaction force thereof, the pan motor 68 rotates in the pan direction with the pan base 16 and the camera 56 thereon.

Similarly, in the tilt rotation mechanism, the tilt motor 98 is provided on the lens frame (which composed the tilt section) on the rotated side. Torque of the tilt motor 98 goes through the reduction gear mechanism which corresponds to a tilt torque transfer means, and is transferred to the pan base 16 of the rotating side. Then, by reaction force thereof, the tilt motor 98 rotates in the tilt direction with the lens frame 18 and the camera 56 thereon.

As described above, in comparison with conventional devices which have the motor separate from the rotation mechanism, this structure of mounting the motor on the rotated side reduces space for mounting the motor and allows a smaller and lighter rotation device.

It can be said that the above structure has a mechanism which completes the rotation function by itself. The above structure thus allows a reduction in size as well as a widely applicable design. In other words, the rotation function is arranged compactly on the rotated side so that a shape of the surrounding case or the like can be determined freely.

Additionally, the camera rotation device 10 of the preferred embodiment has the above torque transfer means composed of spur gears. Spur gears are reversible as a torque transfer mechanism. That is, spur gears on the rotating side and the rotated side spin each other even when someone rotates the camera by hand. The above structure therefore makes it possible to avoid a strain being put on the torque transfer means even if someone carelessly, as a prank or the like, spins the camera by hand. Accordingly, a failure of the rotation device is avoided.

In the camera rotation device 10 of the preferred embodiment, the torque transfer means comprises an end gear fixed to the rotating side and intermediate reduction gears interposing between the motor and the end gear. For the pan direction, the end gear is the pan end gear 32, and the intermediate reduction gears are the four pan reduction gears 74 through 80. For the tilt direction, the end gear is the tilt end gear 44, and the intermediate reduction gears are the four tilt reduction gears 104 through 110. This structure, having the reduction gear mechanisms, optimizes the swiveling speed. The reduction gear mechanisms being composed of spur gears as described above can prevent a failure of the rotation device with the help of the spur gears' reversibility.

Moreover, in the camera rotation device 10 of the preferred embodiment, the above-mentioned intermediate reduction gears are also mounted on the rotated side (the pan base side and the lens frame side) like the motor. Due to this structure, the motor on a driving side and the reduction mechanism on a driven side are arranged on the same base component and complete the rotation function by themselves. This saves space and thus further miniaturizes the device compared to the case of the intermediate reduction gears being provided on the rotating side.

The camera rotation device 10 of the preferred embodiment adopts the gear reduction mechanism for both the pan rotation and the tilt rotation, and uses the same reduction gear for the pan and tilt sides. This commonality of parts, which is to use the same parts, reduces cost. Commonality of parts also lightens the workers' workload of discriminating among parts during assembly, and therefore facilitates assembly tasks and increases productivity.

The camera rotation device of the preferred embodiment is suitably stored in a case with a dome. To obtain bright imagery during a shooting, the dome is preferably transparent. However, if the dome is transparent, the camera rotation device inside will be see-through. Considering this point, in the preferred embodiment above, it is preferable to make the main base 14, the pan base 16, the lens frame 18, the various gears, and the plates 60, 62, 90, and 92 of black resin (or dark-colored resin. The same applies hereinafter). Moreover, as described in earlier paragraphs, the pan motor 68 and the tilt motor 98 are covered with the black resin cylinder which is formed in one piece with the plates 62 and 90 respectively. This structure of using black resin makes the camera apparatus less visible from the outside.

The camera rotation device 10 of the preferred embodiment adopts a structure which provides the motor on the rotated side for both the pan and the tilt rotation mechanisms. However, it is also acceptable to adopt such a structure for either pan or tilt rotation mechanism.

In the preferred embodiment, the pan and the tilt directions are the horizontal and the vertical directions respectively in the arrangement of the FIG. 3. However, the pan and the tilt directions do not need to be limited to these directions.

Furthermore, the preferred embodiment can be applied to a device which has two rotation mechanisms for any two directions. From this point of view, the camera rotation device of the preferred embodiment above comprises: a base section; a first rotation section provided rotatably in a first direction with respect to the base section; a first rotation drive means which rotates the first rotation section with respect to the base section; a second rotation section provided rotatably in a second direction with respect to the first rotation section; and a second rotation drive means which rotates the second rotation section with respect to the first rotation section. In this camera rotation device, at least one of (in the preferred embodiment above, both of) the first rotation drive means and the second rotation drive means comprises: a motor provided on a rotated side; and a torque transfer means which transfers torque of the motor on the rotated side to a rotating side and therefore rotates the motor as well as the rotated side by reaction force of the rotating side. In the preferred embodiment above, the first and the second rotation directions are the pan and the tilt directions respectively. Also from this point of view, this embodiment has an advantage of being smaller as mentioned in earlier paragraphs.

Moreover, in the preferred embodiment, the plurality of intermediate reduction gears are provided between the motor and the rotating side. The number of these gears, the number of teeth, and other parameters can be suitably adjusted according to the necessary reduction ratio. The intermediate reduction gear is not always necessary. One or more gears can be made of soft resin which makes less noise. Furthermore, within the scope of the present invention, it is acceptable to adopt a torque transfer means other than the gear reduction mechanism such as a belt (including a timing belt) or a chain.

As described in earlier paragraphs, the preferred embodiment has an advantage of having a camera less visible from the outside by making various parts of resin in black or the like. It is also acceptable to cover an appropriate portion of the camera rotation device with a black or dark-colored felt and the like to conceal the inside components. This cover suitably changes in shape as the camera rotates. If necessary, it is acceptable to provide a structure of a bellows or the like.

Rotation Type Camera Apparatus

Next, going back to FIGS. 1A and 1B and FIGS. 2A and 2B, the rotation type camera apparatus 1 of the preferred embodiment will be described.

FIGS. 1A and 1B show the rotation type camera apparatus 1 in the standing-mounting position, where FIG. 1A is a side view and FIG. 1B is a front view. FIGS. 2A and 2B show the rotation type camera apparatus 1 in the wall-mounting position, where FIG. 2A is a front view and FIG. 2B is a side view.

As shown in the drawings, the rotation type camera apparatus 1 has a housing 2. The housing 2 has a standing installation surface 3, a wall-mounting installation surface 4, and an incline 5. These correspond to three sides of a triangular prism and give the appearance of an approximately triangular prism as shown in the drawings.

The standing installation surface 3 is one pattern of a standing structure for standing installation, which includes installation by placing or putting on a desk, a table, a floor and so on. The standing installation surface 3 is a bottom face of the housing 2 in the standing-mounting position (free-standing or stand-alone position corresponding to free-standing or stand-alone structure and installation) shown in FIGS. 1A and 1B. In the case of standing installation, the rotation type camera apparatus 1 is placed on a level surface such as a desk and a floor, with the standing installation surface 3 facing down. The standing installation surface 3 is provided with a plurality of short protrusions 6. The protrusion 6, for example, is a round non-slip pad.

The wall-mounting installation surface 4 is one pattern of a wall-mounting structure for wall-mounting installation. As shown in the drawings, the wall-mounting installation surface 4 is perpendicular to the standing installation surface 3. The wall-mounting position is an inverted position of the standing-mounting position as shown in FIGS. 2A and 2B. In the case of the wall-mounting installation, the rotation type camera apparatus 1 is hung on a wall in such a way that the wall-mounting installation surface 4 abuts on the wall. A wall hanger 7 is provided on the wall-mounting installation surface 4. The wall hanger 7 is formed in one piece with the resin-made wall-mounting installation surface 4. The wall hanger 7 has a hole to which a nail or the like projected from the wall is inserted. A well-known structure, for example a structure for hanging a telephone on the wall, can be applied to the wall hanger 7.

The wall hanger 7 shown in the drawings is made only for wall-hanging installation use in the inverted position of the standing-mounting position, but it is acceptable to add a wall hanger for wall-hanging use in the same position as the standing-mounting position. Also, one wall hanger may be made to function as these two types of wall hangers. This structure allows wall-mounting installation in two positions, downside down and upside down, and thus increases flexibility in camera installation styles. For example, one of the two types of wall hangers is used depending on the height of a wall-hanging location; for the lower location the latter wall hanger is used.

The incline 5 inclines with respect to both the standing installation surface 3 and the wall-mounting installation surface 4. In the preferred embodiment, the angle between the standing installation surface 3 and the incline 5 is set to approximately 60 degrees, but in the present invention this angle is not limited to this value. A round opening is provided at the approximate center of the incline 5 and a hemispherical transparent dome type cover 8 is attached to the round opening. The round opening and the dome type cover 8 compose a shooting window.

As described above, the shooting window is provided on the incline 5 so that the shooting window also inclines with respect to a horizontal direction. Especially, in the above structure, the shooting window inclines with respect to the horizontal direction in both the standing-mounting position and the wall-mounting position. That is to say, the shooting window faces up at an angle in the standing-mounting position shown in FIGS. 1A and 1B and faces down at an angle in the wall-mounting position shown in FIGS. 2A and 2B. To be more specific, since the angle between the standing installation surface 3 and the incline 5 is approximately 60 degrees, the shooting window faces upward by approximately 30 degrees in the standing-mounting position and faces downward by approximately 30 degrees in the wall-mounting position.

Figure 13:
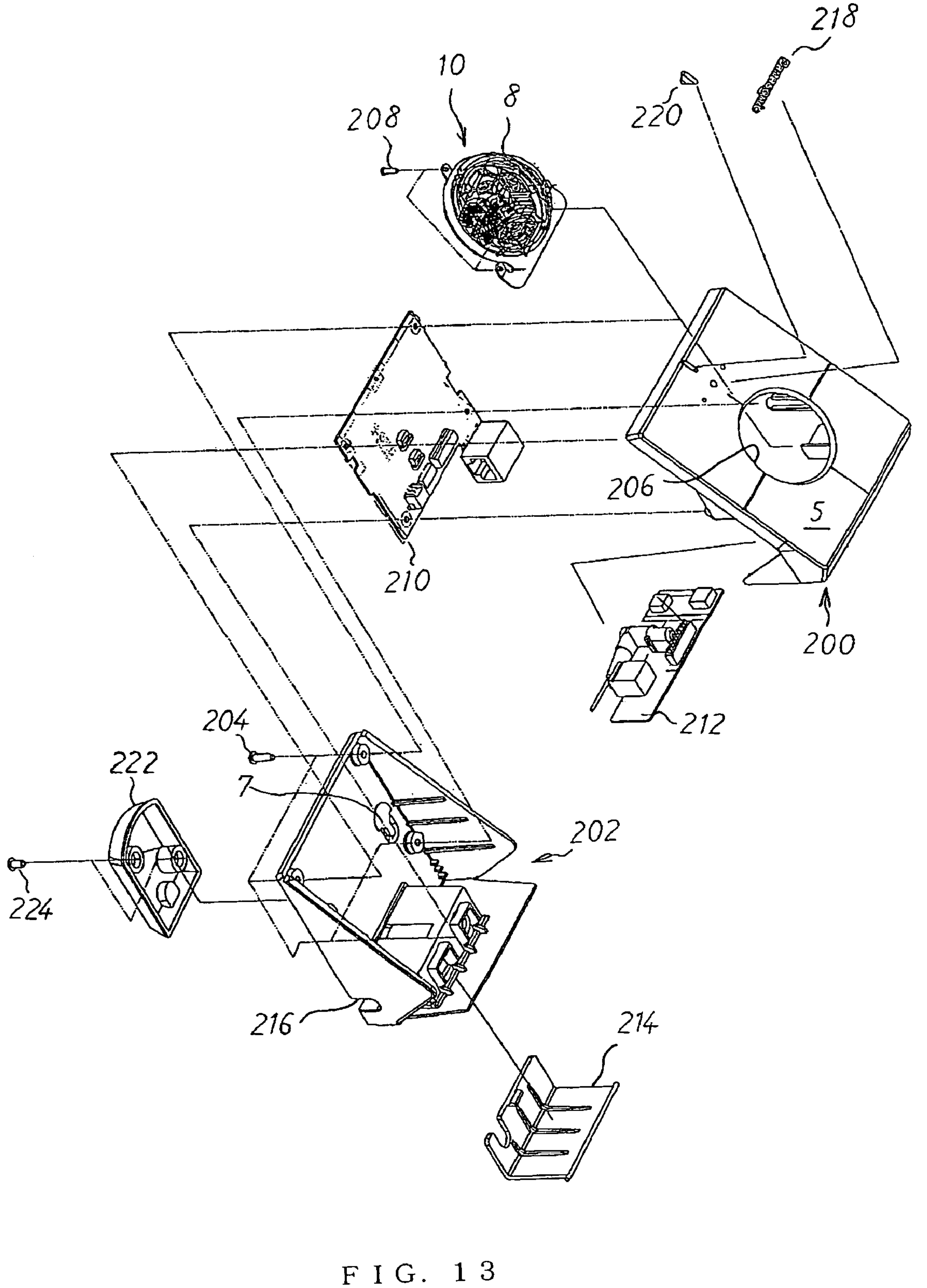
FIG. 13 is an exploded view of the rotation type camera apparatus shown in FIG. 1 and FIG. 2.

FIG. 13 is an exploded view of the rotation type camera apparatus 1. A front housing 200 and a rear housing 202 are assembled by four screws 204 and compose the approximately triangular prism-shaped housing 2 shown in FIGS. 1A and 1B and FIGS. 2A and 2B. The front housing 200 mainly composes the incline, and the rear housing 202 mainly composes the standing installation surface and the wall-mounting installation surface.

The front housing 200 has a round opening 206 in the middle. The dome type cover 8 and the camera rotation device 10 are attached to the round opening 206. A mounting frame of the camera rotation device 10 is attached to the perimeter of the round opening 206 by three screws 208.

A main circuit board 210 and a power supply circuit board 212 are accommodated between the front housing 200 and the rear housing 202. The main circuit board 210 is interposed between bosses of the front housing 200 and bosses of the rear housing 202. The screws 204 which are used to fix the front housing 200 and the rear housing 202 go through holes in four corners of the main circuit board 210. Also, the power supply circuit board 212 is attached to the lower area of the front housing 200.

As shown in the drawing, the lower area of the rear housing 202 protrudes inside. This makes a rectangular prism-shaped hollow or recess on the outside at the lower area of the rear housing 202 although this is not shown in the drawing. A communications connector of the main circuit board 210, and a power connector and a sensor I/O switch of the power supply circuit board 212 are exposed at the hollow through an opening of the rear housing 202. This hollow, as shown in the drawing, is covered by a cover 214. A recess 216 is provided on the side of the rear housing 202 to provide an opening for a cord.

The rear housing 202 is also provided with the wall hanger 7, which has a hole to catch a nail or the like. As already described, the wall hanger 7 shown in the drawings is made only for wall-hanging use in the inverted standing-mounting position, but it is acceptable to add a wall hanger for wall-hanging use in the same position as the standing-mounting position.

In addition, an emblem 218 and an LED guide 220 are attached on the front housing 200. The emblem 218 can be turned upside down so as to be placed appropriately in both the standing-mounting position and the wall-mounting (or inverted) position. The LED guide 220 guides light of an LED provided at the main circuit board to display the operation status of the camera.

Furthermore, on the rear housing 202, a tripod attachment 222 can be attached using a screw 224. The tripod attachment 222 has a tapped hole to attach the rotation type camera apparatus 1 to a tripod. When the tripod is not used, the tripod attachment 222 is not necessary and may be removed.

As a modification, instead of the tripod attachment 222, it is acceptable to provide a tapped hole for a tripod on the back of the rear housing 202. As a further modification, it is acceptable to make the rotation type camera apparatus 1 of the preferred embodiment mountable on a ceiling. In this case, an attachment can be attached as in the case of using a tripod; or the standing installation surface 3 can be directly mounted on a ceiling. Furthermore, it is acceptable to make the rotation type camera apparatus 1 mountable in another suitable position. For example, the apparatus can be made mountable in a way that the front view of the FIG. 1B is rotated clockwise or counterclockwise by 90 degrees, so that the standing installation surface 3 abuts on the wall.

Figure 14:
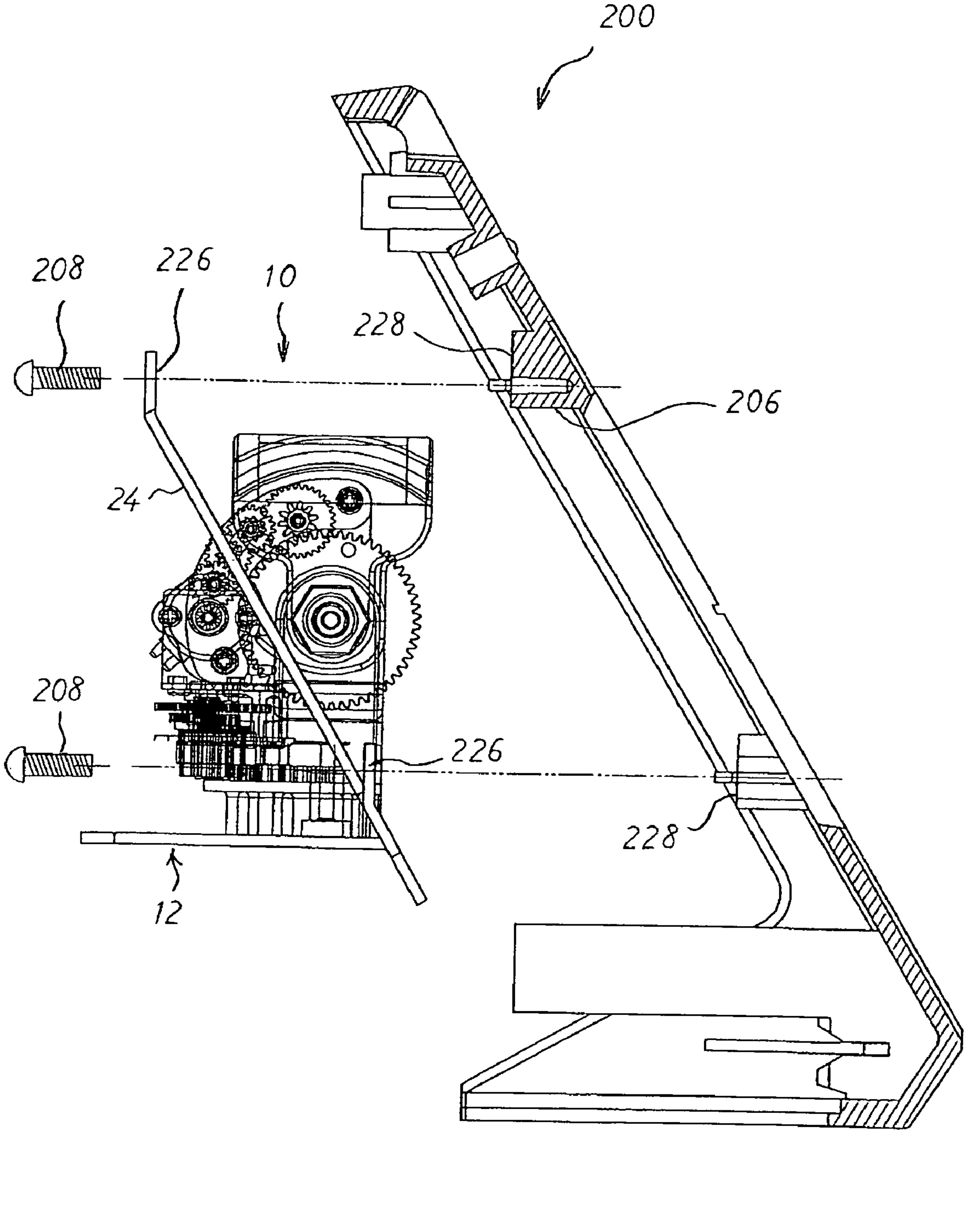
FIG. 14 is a side view showing how the front housing and the camera rotation device shown in FIG. 13 are attached to each other.

FIG. 14 shows a mounting structure of the front housing 200 and the camera rotation device 10. The ring portion 24 of the mounting frame 12 of the camera rotation device 10 has three mounting flanges 226. The shape of the ring portion 24 corresponds with the shape of the round opening 206 of the front housing 200 which forms the shooting window. At the perimeter of the round opening 206, three boss portions 228 are provided. The mounting flanges 226 of the ring portion 24 are secured to the boss portions 228 by the screws 208.

Furthermore, although it is not shown in the drawings, a flange portion on the outer edge of the dome type cover 8 is inserted between the camera rotation device 10 and the front housing 200, more specifically between the ring portion 24 of the mounting frame 12 and the perimeter of the round opening 206. Thus, the dome type cover 8 is arranged on the incline 5, and the camera rotation device 10 and the camera 56 are arranged inside the cover 8.

As described above, the camera rotation device 10 is attached to the front housing 200. In the position of FIG. 14 or in the standing-mounting position of FIGS. 1A and 1B to be more specific, the pan rotation axis Y of the camera rotation device 10 is vertical and the tilt rotation axis X is horizontal. The wall-mounting position is the inverted position of the standing-mounting position, so the pan rotation axis Y and the tilt rotation axis X are vertical and horizontal respectively in the wall-mounting position as well. This is shown in FIGS. 2A and 2B.

Next, the movement of the rotation type camera apparatus 1 will be described. As shown in FIGS. 1A and 1B, at the standing installation, the rotation type camera apparatus 1 is placed on a level surface such as a desk and a floor, in the standing-mounting position where the standing installation surface 3 faces down. The plurality of short protrusions 6 of the standing installation surface 3 come in contact with the desk or the like. Also, as shown in FIGS. 1A and 1B, the dome type cover 8 faces up at an angle, and the camera shoots through this dome type cover 8.

Although this is not mentioned in the above description of the camera rotation device 10, the tilt range of the camera rotation device 10 is set from +90 degrees (right overhead) to −30 degrees, where the horizontal direction is 0 degrees. Such wide shooting range is made possible because the dome type cover 8 is mounted on the incline 5 and faces in a slanting direction.

Next, the pan rotation will be described. In the preferred embodiment, the pan rotation axis Y is vertical, and therefore it is possible to obtain a natural image as described below.

A conventional camera rotation device sets its pan rotation axis based on a shooting window. Therefore, if the shooting window is inclined as in the preferred embodiment and if the conventional camera rotation device is applied as is, the pan rotation axis also inclines. With the pan rotation axis being inclined, a viewer's eyes run up and down along an arch line during pan rotation, as if the viewer is following a path of the sun, a star, or the like across the sky. A viewer does not feel that such image is natural.

On the other hand, the pan rotation axis of the preferred embodiment is vertical. Therefore, the viewer's eyes do not run up and down so much during the pan rotation. The eyes do not move as if to follow a path of the sun, and keeps the same elevation angle during the pan rotation. In this way, a natural image is obtained.

Here, the vertical pan rotation axis described above is perpendicular to the horizontal direction, and is not based on the direction of the shooting window. Therefore, the axis can be referred to as the pan rotation axis based on the horizontal direction of the present invention. Typically, the pan rotation axis is vertical as described above. However, the present invention is not limited to this direction. The pan rotation axis can be off the vertical direction as far as the obtained image seems normal and does not cause problems. Such a pan rotation axis is also included in the concept of the pan rotation axis based on the horizontal direction.

Even if the pan rotation axis of the rotation mechanism is inclined corresponding to the shooting window, it is theoretically possible to obtain a natural image as in the case of the pan rotation on the horizontal surface, as far as the pan rotation and the tilt rotation are controlled minutely. However, such control is extremely complicated. By contrast with this, the preferred embodiment sets the pan rotation axis of the mechanism based on the horizontal surface, and therefore is able to obtain a natural image without complicated control.

It is acceptable to make the rotation type camera apparatus 1 of the preferred embodiment in such a way that a plurality of shooting directions selected in advance are shot. For example, eight directions are registered and the camera shoots these eight directions repeatedly. This registration can be handled by software installed in a computer connected to the rotation type camera apparatus 1. In this case of shooting pre-registered directions, it is also possible to reduce unnaturalness of the obtained image by setting the pan rotation axis Y appropriately as described above.

Next, wall-mounting installation will be described. As shown in FIGS. 2A and 2B, the rotation type camera apparatus 1 is hung on the wall in the wall-mounting position which is the inverted standing-mounting position. The wall-mounting installation surface 4 abuts on the wall, and a nail or the like projected from the wall will be inserted to a hole of the wall hanger 7. As shown in FIGS. 2A and 2B, the dome type cover 8 faces down at an angle, and the camera shoots through this dome type cover 8.

In the wall-mounting position, the camera rotation device 10 is inverted, so the tilt range is from +30 degrees to −90 degrees (directly under), where the horizontal direction is 0 degrees. The dome type cover 8 facing downward in a slanting direction allows such wide shooting range including the area right under the device.

As described above, the wall-mounting position is the inverted position of the standing-mounting position, so the obtained image in the standing-mounting position turns upside down in the wall-mounting position. So, the image in one position (the image in the wall-mounting position in the preferred embodiment) is inverted by software or hardware image processing. This image processing can be handled by a computer inside the rotation type camera apparatus 1 or by the computer connected to the rotation type camera apparatus 1, although these are not shown in the drawings.

Regarding the pan rotation, the pan rotation axis Y is also vertical at the wall-mounting installation. Therefore, as in the case of the standing installation, the viewer's eyes do not run up and down so much during the pan rotation and thus it is possible to obtain a natural image.

As described above, the rotation type camera apparatus of the preferred embodiment according to the present invention sets the shooting window to face in a slanting direction in both the standing-mounting position and the wall-mounting position. According to this structure, it is possible to shoot in an appropriate direction when either standing or wall-mounted. Moreover, the pan rotation axis is set based on the horizontal direction, so it is possible to obtain a natural image with viewer's eyes not running up and down so much during the pan rotation, as mentioned in earlier paragraphs.

In the preferred embodiment, the rotation type camera apparatus is compact as a result of accommodating the camera and the camera rotation device in the dome type cover.

In the preferred embodiment, the standing structure is composed of the standing installation surface. According to this structure, standing installation of the rotation type camera apparatus is made possible just by placing the apparatus on a desk, a floor, or the like.

Also, in the preferred embodiment, the wall-mounting structure is composed of the wall-mounting installation surface and the wall hanger. With this structure, the rotation type camera apparatus can be easily hung on a wall.

As described already as a modification, the wall-mounting structure of the preferred embodiment may comprise a wall hanger for hanging the housing on a wall in such a position that the shooting window faces downwards in a slanting direction, and a wall hanger for hanging the housing on a wall in such a position that the shooting window faces upwards in a slanting direction. This structure allows wall-mounting installation in two positions upside down to each other, and increases flexibility in camera installation styles.

The housing of the preferred embodiment has a triangular prism portion which is composed of the standing installation surface, the wall-mounting installation surface, and the incline (inclined surface) provided with the shooting window. This structure offers a rotation type camera apparatus which can be easily mounted on a desk or the like and hung on a wall with a compact shape of a triangular prism.

It can be said that the rotation type camera apparatus of the preferred embodiment has a structure in which the dome section inclines with respect to the horizontal direction of standing installation and wall-mounting installation. From this point of view, the above-mentioned advantage of the preferred embodiment is also made possible. As mentioned before, the dome section may or may not have a transparent cover.

From another point of view, it can be said that the preferred embodiment makes it possible to obtain a more natural image with an arrangement of the inclined shooting window. The installation position of the rotation type camera apparatus is not limited in this respect. For example, the apparatus may be used only in either the standing-mounting position or the wall-mounting position. Further, in the preferred embodiment, the shooting window is provided to face in a slanting direction with respect to a horizontal direction at installation, but the pan rotation axis is set based on the horizontal direction. According to this structure, it is possible to obtain a natural image with a viewer's eyes not running up and down so much during the pan rotation.

Other modifications of the above embodiment will now be described. For the shooting window, the dome type cover is not always necessary. For example, it is acceptable to attach a cylindrical cover to the shooting window. A flat cover is also acceptable. A cover can be removed as well. However, by using the dome type cover placed on the incline, the preferred embodiment gains the advantage of the present invention of ensuring desired shooting directions with a more compact structure.

In the preferred embodiment, the standing installation surface and the wall-mounting installation surface are two different surfaces. But it is also acceptable to have one surface to function as an installation surface for both standing and wall-mounting purposes. In such cases, the camera apparatus can be turned 90 degrees from the standing-mounting position to the wall-mounting position. With this structure, if the pan rotation axis is vertical in the standing-mounting position, it will be horizontal in the wall-mounting position. Also, if the pan rotation axis is vertical in the wall-mounting position, it will be horizontal in the standing-mounting position. In either case, it can be said that the pan rotation axis is set based on the horizontal direction of the standing-mounting position and the wall-mounting position. Such a structure is also included in the scope of the present invention.

As described up to this point, the present invention offers a rotation type camera apparatus which has the following superior advantages: it is possible to shoot in appropriate directions both when standing or wall-mounted because the shooting window is set to face in a slanting direction in both the standing-mounting position and the wall-mounting position; and it is possible to obtain a natural image with viewer's eyes not running up and down so much during the pan rotation because the pan rotation axis is set based on the horizontal direction.

While there has been described what is at present considered to be a preferred embodiment of the invention, it will be understood that various modifications may be made thereto, and it is intended that appended claims cover all such modifications as fall within the true spirit and scope of the invention.

What is claimed is:

1. A rotation type camera apparatus comprising:

a housing provided with a standing structure for standing installation and with a wall-mounting structure for wall-mounting installation, and having a shooting window formed thereon facing in a slanting direction with respect to a horizontal direction in a standing-mounting position and in a wall-mounting position;

a camera provided so as to be able to shoot outside from the shooting window; and a camera rotation device having a pan rotation axis substantially perpendicular to the horizontal direction in both of the standing-mounting position and the wall-mounting position.

2. A rotation type camera apparatus according to claim 1, wherein the housing has at the shooting window a dome type cover facing in the slanting direction, and at least one portion of the camera and the camera rotation device is accommodated in the dome type cover.

3. A rotation type camera apparatus according to claim 1, wherein the standing structure is composed of a standing installation surface provided on the housing.

4. A rotation type camera apparatus according to claim 1, wherein the wall-mounting structure comprises a wall-mounting installation surface provided on the housing and a wall hanger provided on the wall-mounting installation surface.

5. A rotation type camera apparatus according to claim 4, wherein the wall-mounting structure comprises a wall hanger for hanging the housing on a wall in such a position that the shooting window faces downwards in a slanting direction, and a wall hanger for hanging the housing on a wall in such a position that the shooting window faces upward in a slanting direction.

6. A rotation type camera apparatus, comprising:

a standing structure for standing installation;

a wall-mounting structure for wall-mounting installation;

a dome section provided so as to face in a slanting direction with respect to a horizontal direction of a standing-mounting position and a wall-mounting position;

a camera provided so as to be able to shoot outside from the dome section; and a camera rotation device having a pan rotation axis substantially perpendicular to the horizontal direction in both of the standing-mounting position and the wall-mounting position.

7. A rotation type camera apparatus comprising:

a housing provided with a first mounting structure for a first mounting position and with a second mounting structure for a second mounting position, and having a shooting window formed thereon facing in a slanting direction with respect to a horizontal direction in the first mounting position and in the second mounting position;

a camera provided so as to be able to shoot outside from the shooting window; and a camera rotation device having a pan rotation axis substantially perpendicular to the horizontal direction in both of the first mounting position and the second mounting position.

8. A rotation type camera apparatus according to claim 1, wherein said shooting window faces upward by approximately 30 degrees in the standing-mounting position and faces downward by approximately 30 degrees in the wall-mounting position.

* * * * *